United States Patent [19]

Watabe

[11] Patent Number: 4,507,356
[45] Date of Patent: Mar. 26, 1985

[54] MOISTURE-PERMEABLE SHEETS
[75] Inventor: Nobuo Watabe, Tokyo, Japan
[73] Assignee: Aderans Company, Ltd., Japan
[21] Appl. No.: 431,690
[22] Filed: Sep. 30, 1982
[30] Foreign Application Priority Data May 20, 1982 [JP] Japan .................................. 57-83990

[51] Int. Cl.³ ................................................ B32B 7/00
[52] U.S. Cl. .................................... 428/252; 428/253; 428/315.5; 428/423.1; 428/423.7
[58] Field of Search ............... 428/245, 252, 253, 254, 428/423.1, 423.7, 315.5

[56] References Cited

U.S. PATENT DOCUMENTS 4,425,395 1/1984 Negishi et al. .................... 428/423.1
4,436,570 3/1984 Neuhaus et al. .................. 428/423.1

Primary Examiner—James J. Bell
Attorney, Agent, or Firm—Cantor and Lessler

[57] ABSTRACT

A multi-layer sheet used particularly as a wig base includes a lowermost layer of a poly-$\alpha$-amino acid derivative, an uppermost layer of a polyurethane elastomer and woven or knitted fabric of nylon or polyester as reinforcing material, said layer of polyurethane elastomer alone or both said layer of polyurethane elastomer and said layer of poly-$\alpha$-amino acid possessing moisture permeability.

To prepare the sheet, finely-divided, water-soluble salt particles are dispersed in the polyurethane elastomer alone or both in the polyurethane elastomer and the amino acid derivative in the presence of a titanate coupling agent serving as a dispersant.

4 Claims, No Drawings

MOISTURE-PERMEABLE SHEETS

BACKGROUND OF THE INVENTION

The present invention relates to an improved moisture-permeable sheet, and to a process for the preparation of the same.

More specifically, it pertains to a sheet consisting of a thin-layer film having a thickness of the order of 0.2 mm and possessing elasticity, mechanical strength and water permeability, and to a process for the preparation of a sheet having moisture permeability which permits an optional control of water permeability. The sheet obtained in accordance with the present invention is primarily applicable as a wig base to be planted with natural or artificial hair. The present sheet may also be used as artificial skin and a general-purpose sheet.

It has now been found that currently available wig bases comprising mainly a urethane elastomer have less moisture permeability and air permeability. In general, the amount of sweat emanating from man's skin is 350 g/m$^2$/24 hr on the average, depending upon the condition of health. Accordingly, the prior art wig base becomes stuffy on wearing, and does not stand up to use over an extended period due to its accelerated deterioration.

Scores of patent specifications have been filed, which disclose processes for improving the air or moisture permeability of polyurethane elastomer sheets (see, for instance, Japanese Patent Publications Nos. 55-35503 and 54-24428). However, these specifications chiefly teach the application of sheets for making synthetic leather or non-woven fabric, and suggest nothing about the use of the sheets as air or moisture permeable wig bases having a thickness of the order of 0.2 mm.

A film-forming dope composed mainly of a poly-α-alkyl-L-glutamate, that is a polypeptide of a α-alkyl-L-glutamic acid, is sold on the market under the trademark AJICOAT by Ajinomoto Co., Inc. This material can provide a thin film with a thickness of about 30 microns and a considerable tensile strength, but exhibits no rubber elasticity as such owing to its linear polymer structure. For this reason, that material cannot be used as a wig base over a longer period of time.

Recently, the composition of (co)polymers of amino acid derivatives other than glutamic acid has been open to the public. The (co)polymers excel not only in moisture permeability but also, particularly, in oxygen permeability, and are used as artificial skin for treating a burn; however, they possess less mechanical strength and no elasticity.

SUMMARY OF THE INVENTION

A main object of the present invention is therefore to provide a sheet having a thickness of about 0.2 mm to ensure that it possesses sufficient elasticity and mechanical strength, and having processabilities such as formability and transplantability which are equivalent to, or higher than, those of the prior art sheet composed mainly of a polyurethane elastomer.

Another object of the invention is to provide a process for the preparation of a sheet having moisture permeability which permits an optional control of water permeability between 500 and 2000 g/m$^2$/24 hr.

The sheet obtained according to the present invention can be used as a wig base. Furthermore, the sheet may be used as artificial skin and as a general-purpose sheet in a field where moisture permeability is particularly of importance.

DETAILED DESCRIPTION OF THE INVENTION

These and other objects and features of the present invention will become apparent from a reading of the following detailed description.

The poly-α-amino acid derivative used in the present invention is composed mainly of a polypetide of an α-amino acid derivative. For instance, use may be made of poly-γ-methyl-L-glutamate that is a polypeptide of γ-methyl-L-glutamic acid ester.

The polyurethane elastomer used in the present invention is obtainable from an isocyanate and a polyol. As the polyol, use may be made of a polyether or polyester.

The woven fabric of nylon or polyester fibers used as a reinforcing material in the present invention is commercially available, and is preferably as thin as possible. Full-fashioned nylon stocking texture and gauze are preferably used as the woven fabrics of nylon and polyester fibers, respectively. It is desirable that these woven fabrics be pre-treated with, e.g., a bisphenol A type epoxy resin to improve the adherence thereof to the poly-α-amino acid derivative and the polyurethane elastomer.

The finely-divided, water-soluble salt used in the present invention has a particle size of not more than 200 or 400 mesh. The combination and amount of these particles permit a control of the water permeability of the sheet. For instance, the more the amount of table salt used as the finely-divided, water-soluble salt, the higher the permeability will be, whereas the less the amount of said salt, the lower the permeability will be. The water permeability of the sheet may also be controlled by varying the thickness of the layer of the poly-α-amino acid derivative or the polyurethane elastomer. The thicker the layer, the lower the permeability will be, and vice versa.

By preferance, a dispersant is used to improve the dispersion of salt particles. For instance, a titanate type coupling agent may previously be deposited onto salt particles to a sufficient degree. In the absence of any titanate type coupling agent serving as a dispersant, the dispersion of salt particles is so unsatisfactory that the mechanical strength of the resulting sheet drops.

The sheet is immersed in warm water for several hours to remove the salt particles therefrom by elution, thus leaving in the sheet a number of micropores. Thus the sheet is given sufficient moisture permeability and air permeability. The titanate type coupling agent used in the present invention may be tetraisopropyl bis(dioctylphosphite)titanate (obtainable under the trade mark PRENACT 41B, Ajinomoto Co., Inc.), isopropyl triisostearoyl titanate, and tetraoctyl bis(ditridecylphosphite) titanate, etc.

In the present invention, at least one of the poly-α-amino acid derivative and the polyurethane elastomer may be dyed to the color of the skin or other suitable colors.

The sheet obtained according to the present invention comprises a lowermost layer, the layer to be in contact with the skin, consisting of the polymer of α-amino acid which is a substance similar to protein, and an uppermost layer consisting of polyurethane elastomer. Thus, since the layer to be in touch with the skin is made of a substance similar to protein, the feel of the sheet, when in contact with the skin, is natural and comfortable.

To add to this, because of the inclusion in the sheet of woven or knitted fabric of nylon or polyester as an element in the composite structure, improved flexibility, elasticity, tensile strength and tearing strength are given to the sheet without causing a lowering of moisture or air permeability. Furthermore, the obtained sheet is uniform and has a thickness of about 0.2 mm.

The present invention will now be explained further with reference to the following, non-restrictive examples.

EXAMPLE 1

Full-fashioned nylon stocking texture of knitted nylon fabric was immersed in a 7% solution of a coupling agent bisphenol A type epoxy resin (obtainable under the trade mark EPICOAT 825, Yuka Shellepoxy K.K.) in methyl ethyl ketone, followed by drying.

A polyethylene film was applied over a wig model formed of gypsum for easy release, and the thus treated nylon fabric was spread over the said film. The nylon fabric was then held in place with the use of a tape. One hundred grams of a 10% solution of poly-$\gamma$-methyl-L-glutamate (obtainable under the trademark AJICOAT A-2000, Ajinomoto Co., Inc.) were coated onto the said fabric, and maintained in a forced stream of warm air to volatilize the solvent, thereby forming a first film.

A 20% solution of polyurethane elastomer (thermoplastic elastomer having a Shore hardness of A85 and obtainable under the trademark of ELASTRAN E 985, Nippon Elastran K.K.) in a mixed solvent of methyl ethyl ketone and N, N'-dimethylformamide (volume ratio of 1:1) was prepared. A 0.3% toluene solution of a titanate coupling agent (obtainable under the trademark PRENACT 41B, Ajinomoto Co., Inc.) serving as a dispersant was sufficiently deposited onto 10 grams of finely divided salt particles which passed through a 400-mesh sieve. The thus treated salt particles were sufficiently dispersed in the dope by stirring.

Fifty (50) grams of the dope dispersion were coated onto the first film, which was then dried by a forced stream of air. Fifty (50) grams of the same dope dispersion were again coated onto the dried coating and dried in warm air. The resulting sheet was then removed from the model. The thus obtained curved base sheet was immersed in warm water to remove the salt particles therefrom by elution. The thus treated sheet was dried in warm air to yield a flexible and moisture-permeable sheet to which hair could be transplanted. The physical properties of the sheet were:

Tensile strength: 580 Kg/cm$^2$
Tearing strength: 110 Kg/cm
Moisture permeability: 560 g/m$^2$/24 hr Transplantation of hair to this base gave a wig which could be worn with a comfortable feel without becoming stuffy with sweat, and had sufficient strength.

EXAMPLE 2

According to the procedures of Example 1, a first layer was prepared using AJICOAT XA 3500 instead of AJICOAT A 2000. The reinforcing material used was printing gauze of polyester fibers, not nylon. The gauze had been similarly treated with an epoxy resin solution as Example 1. For the polyurethane elastomer dope, use was made of salt particles which passed through a 200-mesh sieve, viz., had a particle size larger than that of the salt used in Example 1. Other conditions were identical with those mentioned in Example 1.

The physical properties of the obtained sheet were:
Tensile Strength: 450 Kg/cm$^2$
Tearing Strength: 85 Kg/cm
Moisture Permeability: 1020 g/m$^2$/24 hr

EXAMPLE 3

To improve further mositure permeability, 10 grams of salt passing through a 400-mesh sieve were added per 100 grams of a 10% solution of AJICOAT XA 3500. Other conditions were identical with those mentioned in Example 1. The physical properties of the obtained sheet were:
Tensile Strength: 460 Kg/cm$^2$
Tearing Strength: 90 Kg/cm
Moisture Permeability: 1850 g/m$^2$/24 hr As mentioned in the foregoing, the sheet obtained according to the present invention can be used as a wig base to which hair is to be grafted. The obtained wig can be worn with a comfortable feel and without becoming stuffy with sweat. In addition, the wig has elasticity and strength sufficient to stand repeated use over an extended period of time.

The sheet obtained according to the present invention may be used as artificial skin and a general-purpose sheet in the field where moisture permeability is particularly of importance.

What is claimed is:

1. A multi-layer sheet comprising a first layer of a poly-$\alpha$-amino acid derivative film having embedded therein a reinforcing material selected from the group consisting of woven fabric and knitted fabric made of nylon or polyester, and a second layer of a polyurethane elastomer film, at least one of said first and second layers being moisture permeable.

2. The sheet as recited in claim 1, in which said moisture permeability is between 500 and 2000 g/m$^2$/24 hr.

3. The sheet as recited in claim 1, wherein said poly-$\alpha$-amino acid derivative is poly-$\alpha$-methyl-L-glutamate.

4. The sheet as recited in claim 1, wherein said polyurethane elastomer film contains a multiplicity of micropores.

* * * * *